United States Patent Office 2,986,468
Patented May 30, 1961

2,986,468

CHLOROHYDROXYQUINOLINE AS GROWTH PROMOTER

Robert B. Edwards, Bound Brook, N.J., assignor to Olin Mathieson Chemical Corporation, New York, N.Y., a corporation of Virginia No Drawing. Filed Jan. 15, 1959, Ser. No. 786,912

3 Claims. (Cl. 99—4)

This invention relates to and has for its object the provision of an improved means for stimulating the growth of poultry. More particularly this invention relates to novel growth promoting compositions and to their use in promoting the growth of poultry.

It has been found in accordance with the present invention that the growth of poultry is substantially accelerated by incorporating a chlorohydroxyquinoline into a conventional poultry feed. The amount of chlorohydroxyquinoline incorporated into the feedstuff may vary from as little as about 4 grams per ton of feed to as much as about 100 grams per ton of feed. While the chlorohydroxyquinoline can be added in amounts below about 4 grams per ton of feed, the improvment in growth at such lower concentration is so slight as to be without effect for practical purposes, Conversely, while the proportion of chlorohydroxyquinoline added can exceed about 100 grams per ton of feed no practical purpose is served by so doing inasmuch as no further increase of growth is realized. Hence, for practical purposes, the amount of chlorohydroxyquinoline added lies in the range of from about 4 grams to about 100 grams per ton of feed and, in the preferred embodiment of the invention, is in the proportion of about 40 grams per ton of feed.

The chlorohydroxyquinoline employed in the practice of the present invention may be any chlorinated hydroxyquinoline such as, for example, 5-chloro-8-hydroxyquinoline, 7-chloro-8-hydroxyquinoline, 5,7-dichloro-8-hydroxyquinoline, or mixtures thereof.

The improved feedstuffs of the present invention are readily prepared by admixing the chlorohydroxyquinoline with the feedstuff in the particular desired proportion based on the amount of solid feed supplied, air dry basis. When poultry, such as turkeys, were fed the chlorohydroxyquinoline-containing feedstuff a substantial improvement in the rate of growth was observed as compared with the growth rate of the poultry receiving a control diet of the same amount of feedstuff. It is evident, therefore, that a greater output in terms of gross weight is obtainable in a given period of time from a given lot of poultry. In other words, the addition of a chlorohydroxyquinoline to the feedstuff permits more efficient utilization of the feedstuff. Furthermore, since the poultry are larger the ratio of fatty tissue to bone and offal is greater.

To illustrate the growth promoting effects of chlorohydroxyquinoline, 160 Broad Breasted Bronze male turkeys were divided into 16 groups, each group consisting of 10 poults. Eight of these groups were fed a high-protein, high-energy basal diet and eight groups were fed the same basal diet containing a mixture of chlorohydroxyquinolines (as naturally obtained by chlorinating 8-hydroxyquinoline) in the ratio of 40 grams of total weight of the chlorohydroxyquinolines per ton of feed. When the poults reached six weeks of age the individual body weights were taken with the results set out below:

| Diet | Final Body Weight, gm. | Percentage Increase |
|---|---|---|
| Basal | 1,085 | |
| Basal+40 gms. of CHQ [1]/ton of feed | 1,263 | 16.41 |

[1] CHQ=a mixture of 5-chloro-8-hydroxyquinoline, 7-chloro-8-hydroxyquinoline and 5,7-dichloro-8-hydroxyquinoline, in proportions resulting naturally from the chlorination of 8-hydroxyquinoline.

As the above table demonstrates, a highly significant improvement in the rate of growth in birds receiving chlorohydroxyquinoline was realized. The advantages to grower and to consumer alike are self-evident.

The basal feedstuff (diet) employed in the above experiment had the following percentage composition:

| | Percentage |
|---|---|
| Ground yellow corn | 30.07 |
| Ground heavy oats | 4.93 |
| Wheat standard middlings | 4.92 |
| Alfalfa meal | 4.92 |
| Meat scrap, 50% protein | 7.40 |
| Soybean meal | 29.58 |
| Fish meal | 7.40 |
| Dried skim milk | 4.92 |
| Dried yeast | 2.46 |
| Ground limestone | 1.47 |
| Steamed bone meal | 0.98 |
| Iodized salt | 0.34 |
| Choline chloride | 0.25 |
| Manganese sulfate | 0.024 |
| D-activated sterol | 0.05 |
| Vitamin A and D oils | 0.15 |

Other feedstuffs, with or without supplementary ingredients, which are suitable for use in the compositions of the present invention will be obvious to those skilled in the art. Such feedstuffs contain edible vegetable and/or animal protein matter and preferably other ingredients customarily employed in the poultry raising industry.

The invention may be variously otherwise embodied within the scope of the appended claims.

What is claimed is:

1. A poultry feed composition comprising a poultry feedstuff and chlorohydroxyquinoline, said chlorohydroxyquinoline being present in the proportion of from about 4 grams to about 100 grams for each ton of said feedstuff.

2. A poultry feed composition comprising a poultry feedstuff and chlorohydroxyquinoline, said chlorohydroxyquinoline being present in the proportion of about 40 grams for each ton of said feedstuff.

3. A method of promoting the growth of poultry which comprises introducing into the diet of said poultry chlorohydroxyquinoline in the proportions of from about 4 grams to about 100 grams for each ton of feedstuff.

References Cited in the file of this patent

UNITED STATES PATENTS 2,831,795  Hymas  Apr. 22, 1958

OTHER REFERENCES

De Volt: Poultry Science 29, Nov. 6, 1950, pp. 924–6.